(12) United States Patent
Hirano et al.

(10) Patent No.: US 6,935,786 B2
(45) Date of Patent: Aug. 30, 2005

(54) HYDRAULIC BEARING

(75) Inventors: Minoru Hirano, Okazaki (JP);
Toshihiko Shima, Okazaki (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 17 days.

(21) Appl. No.: 10/254,761

(22) Filed: Sep. 26, 2002

(65) Prior Publication Data

US 2003/0123765 A1 Jul. 3, 2003

(30) Foreign Application Priority Data

Sep. 26, 2001 (JP) ........................................ 2001-294420
Sep. 9, 2002 (JP) ........................................ 2002-262912

(51) Int. Cl.$^7$ ............................................... F16C 17/02
(52) U.S. Cl. ........................................ 384/118; 384/120
(58) Field of Search ............................... 384/120, 111, 384/116, 118, 119

(56) References Cited

U.S. PATENT DOCUMENTS

| 4,181,378 A | 1/1980 | Schmaeng |
| 4,285,551 A | 8/1981 | Suzuki et al. |
| 5,447,375 A | 9/1995 | Ochiai et al. |
| 5,700,092 A | * 12/1997 | Wasson et al. ............... 384/115 |
| 6,547,438 B2 | * 4/2003 | Shima ......................... 384/118 |

FOREIGN PATENT DOCUMENTS

| JP | 10-227312 | 8/1998 |
| JP | 10-259823 | 9/1998 |

* cited by examiner

*Primary Examiner*—Lenard A. Footland
(74) *Attorney, Agent, or Firm*—Oblon, Spivak, McClelland, Maier & Neustadt, P.C.

(57) ABSTRACT

A hydraulic bearing that supports a rotating shaft comprises a bearing metal. On a surface of the bearing metal, a hydrostatic pocket and a land portion are formed. The land portion is defined by the hydrostatic pocket and generates hydrodynamic pressure in response to a rotation of the rotating shaft. The hydraulic bearing further comprises a pressure fluid supplying source and an oil-supplying hole. The oil-supplying hole is opened in the hydrostatic pocket and provides pressure fluid from the pressure fluid supplying source to the hydrostatic pocket. On the land portion, a drain hole that drains the fluid is formed. On the way of a drain passage, a check valve is disposed. Since the drain hole does not separate the land portion, deterioration of bearing rigidity is restrained. Further, since the fluid is drained through the drain hole, thermal expansion of the bearing metal due to heat generation of the fluid is restrained. Moreover, according to the check valve, it is possible to prevent suctioning air into the hydraulic bearing when negative pressure generates at the land portion.

13 Claims, 12 Drawing Sheets

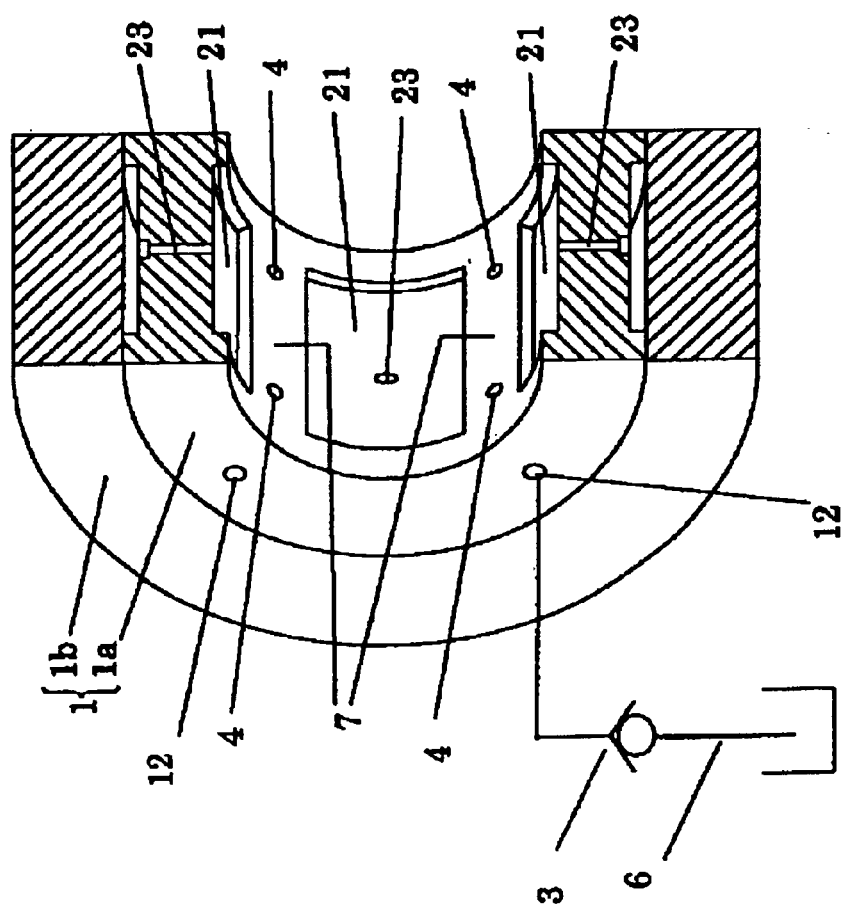

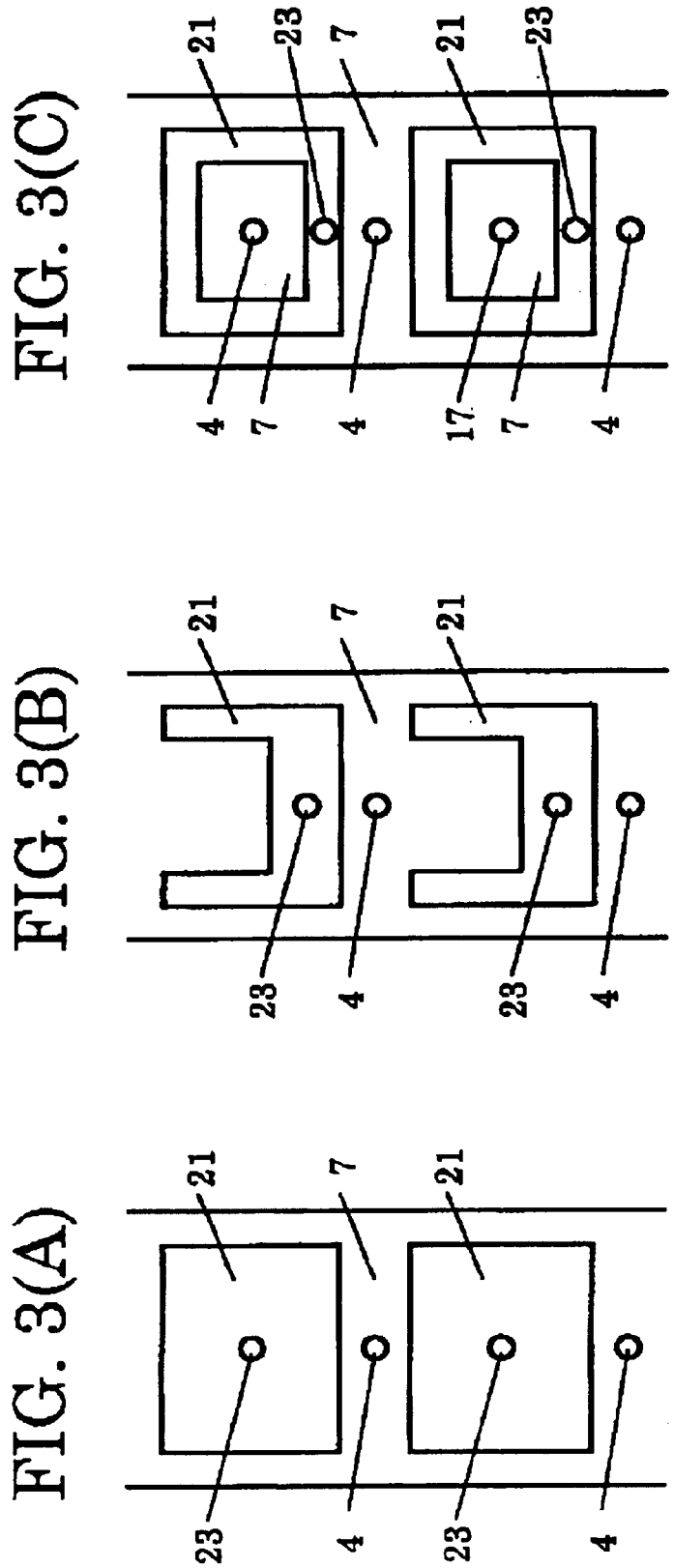

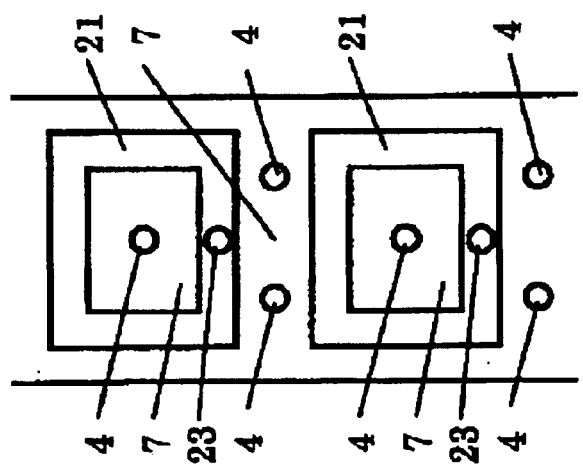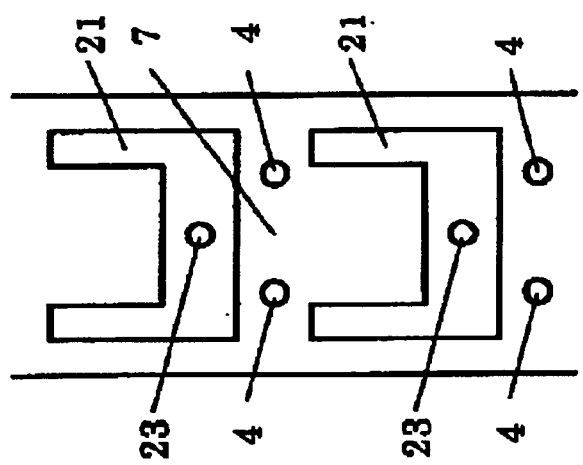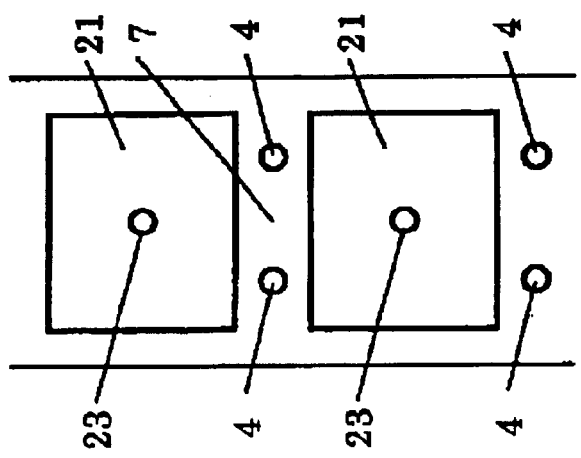

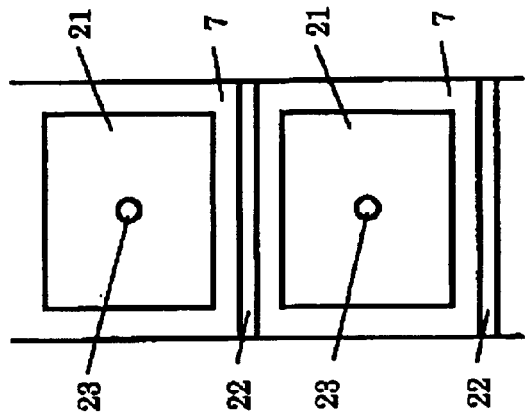
FIG. 12(A) (PRIOR ART) NON-SEPARATED TYPE
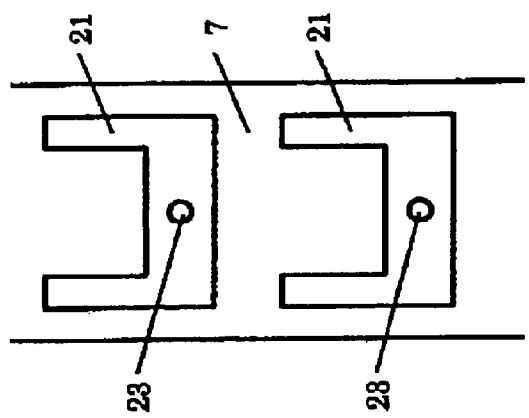
FIG. 12(B) (PRIOR ART) NON-SEPARATED TYPE
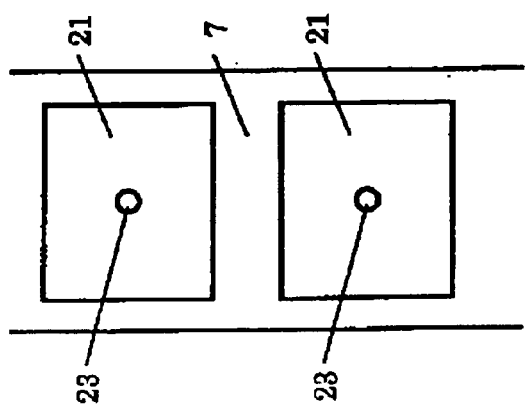
FIG. 12(C) (PRIOR ART) SEPARATED TYPE

HYDRAULIC BEARING

INCORPORATION BY REFERENCE

The entire disclosure of Japanese Patent Applications Nos. 2001-294420 filed on Sep. 26, 2001 and 2002-262912 filed on Sep. 9, 2002 including specification, drawings and abstract is herein by reference in its entirety.

BACKGROUND OF THE INVENTION

1. Field of the Invention

The invention present relates to a hydraulic bearing that supports a rotating shaft or the like.

2. Description of the Related Art

FIGS. 12(A) to 12(C) are three partially developments showing inner surfaces of bearing metals which constitute radial hydraulic bearings according to the prior arts. Plural hydrostatic pockets 21 having quadrilateral grooves as shown by FIGS. 12(A) and 12(C) or U-shaped grooves as shown by FIG. 12(B) are formed on each inner surface of the bearing metals along a rotational direction of a rotating shaft. An oil-supplying hole 23 is formed in each hydrostatic pocket 21. Land portions 7 formed on the inner surface of the bearing metal except for the hydrostatic pockets 21 are for generating hydrodynamic pressure.

Here, the hydraulic bearing is distinguished to two types in which one is a separated type as shown by FIG. 12(C), and the other is a non-separated type as shown by FIG. 12(A) or 12(B) in accordance with a shape of the land portion 7. The land portion 7 of the non-separated type is circumferentially formed on all of the surface of the bearing metal. On the other hand, the land portions 7 of the separated type are separated along with rotational axis of the rotational shaft by drain grooves 22 that are formed between adjacent two hydrostatic pockets 21. In the aforementioned hydraulic bearings, when pressure-adjusted lubricant oil is supplied to the hydrostatic pockets 21 through the oil-supplying hole 3, the rotating shaft is supported hydrostatically by the filled lubricant oil between the hydrostatic pockets 21 of the bearing metal and an outer surface of the rotating shaft. Simultaneously, the lubricant oil is filled between the land portion 7 and the rotating shaft. With the filled lubricant oil, when the rotating shaft is rotated in the bearing metal, the rotating shaft is supported hydrodynamically by wedge effect that is generated between the land portions 7 and the outer surface of the rotating shaft.

Then, at the non-separated type bearing, especially in a case of U-shaped hydrostatic pockets 21 such as shown by FIG. 12(B), since an area of each land portion 7 is large and continuously, a large amount of hydrodynamic pressure is generated. Therefore, the non-separated type bearing is effective in high rigidity and high damping effect. However, in case of high rotating speed, a great heat due to fluid friction is generated at the land portions 7. The great heat causes thermal expansion of the bearing metal, and a clearance between the bearing metal and the rotating shaft decreases. As the result, calorific value by fluid friction increases, and thermal expansion of the bearing metal increases. This causes such a vicious circle that deteriorate the performance of the bearing.

On the other hand, at the separated type bearing, heat generated at the land portions 7 is restrained because it is easy to drain the lubricant oil by existence of the drain grooves 22. However, existence of the drain grooves 22 causes deterioration of the rigidity because each land portion 7 is separated and small. Moreover, the separated type bearing tends to cause cavitation.

We, Toyoda Koki Kabushiki Kaisha, applied Japanese Patent Application No. 2000-289889 filed on Sep. 25, 2000 which resolves two problems above. According to that application, plural drain holes are formed at land portions of bearing metal. One end of each drain hole is opened on the land portion, and the other end of each drain hole is connected to a tank. Therefore, since the area of the land portions is essentially as large as the non-separated type bearing as shown by FIGS. 12(A) and 12(B), the hydraulic bearing is effective in high rigidity similar to the non-separated type bearing. In addition, since the lubricant oil at the land portions is drained to the tank through each drain hole, the hydraulic bearing has low temperature rise that is close to the separated type bearing as shown by FIG. 12(C).

The hydraulic bearing above, however, the land portions are connected to the tank released to the atmospheric pressure. In connection with the eccentricity of the rotational shaft relative to the bearing metal, negative pressure may be generated at one region in the hydraulic bearing. Then, air in the tank is suctioned into the land portions through the drain holes by negative pressure. More rotational speed of the rotational shaft, negative pressure generates easier even though the eccentricity is less. When rotational speed of the rotating shaft become large, it is facilitates to generate negative pressure even if the eccentricity of the rotating shaft is small.

SUMMARY OF THE INVENTION

It is an object of the present invention to provide an improved hydraulic bearing.

A hydraulic bearing that supports a rotating shaft comprises a bearing metal, on which surface at least one hydrostatic pocket and at least one land portion are formed. The land portion is defined by the hydrostatic pocket and hydrodynamic pressure is generated thereby. The hydraulic bearing further comprises a pressure fluid supplying source and an oil-supplying hole. The oil-supplying hole is opened in the hydrostatic pocket and provides pressure fluid from the pressure fluid supplying source thereto. On the land portion, a drain hole is formed for draining the fluid. The drained fluid flows to a tank through a drain passage communicating the drain hole to the tank. On the way of the drain passage, an anti suctioning unit is installed to prevent air from suctioning into the land portion.

Thus, the hydraulic bearing providing the hydrostatic pocket and the land portion functions not only as a hydrostatic bearing but also as a hydrodynamic bearing. Then, since the fluid is drained through the drain hole, thermal expansion of the bearing metal due to heat generation of the fluid is restrained. Moreover, since the anti suctioning unit prevents air from suctioning into the hydraulic bearing, cavitation generated by suctioned air is prevented.

BRIEF DESCRIPTION OF THE DRAWINGS

Further objects, features and advantages of the present invention will become apparent from the following description of the preferred embodiments with reference to the accompanying drawings, wherein:

FIG. 2 is a sectional perspective view of a bearing metal according to the first embodiment of the present invention;

FIGS. 3(A), 3(B) and 3(C) are partial developments of inner surfaces of the bearing metals according to the first embodiment of the present invention;

FIGS. 4(A), 4(B), and 4(C) are partial developments of inner surfaces of other bearing metals according to the first embodiment of the present invention;

FIGS. 12(A), 12(B) and 12(C) are partial developments of inner surfaces of bearing metals that constitute radial hydraulic bearings according to the related arts;

DESCRIPTION OF PREFERRED EMBODIMENTS

Preferred embodiments of a hydraulic bearing according to the invention will be described hereinafter with reference to the accompanying drawings.

[First Embodiment]

Figure 1:
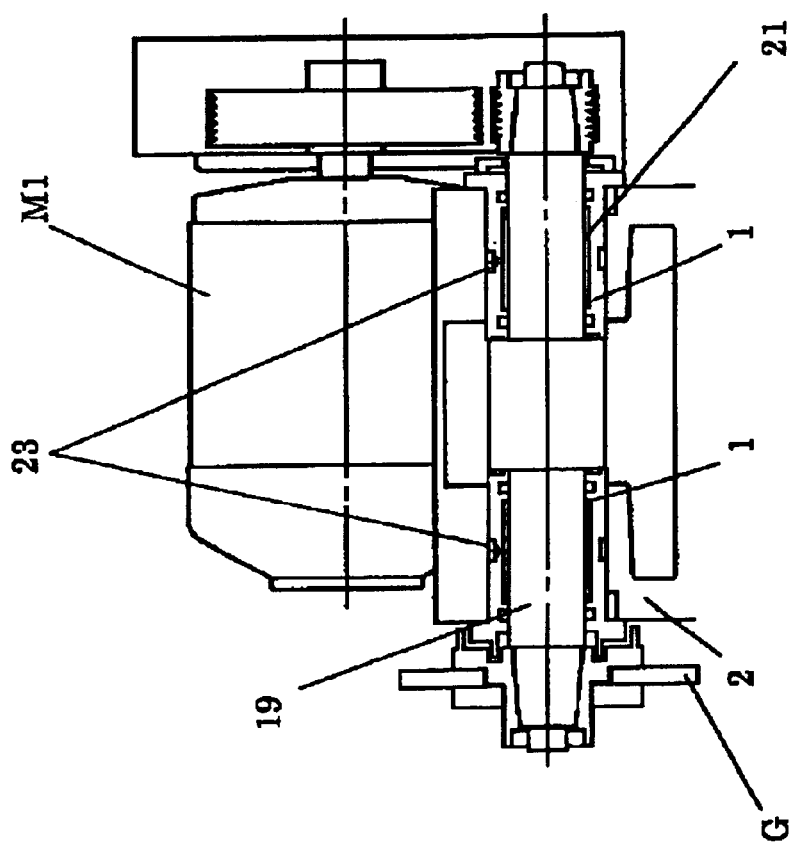
FIG. 1 is a schematic illustration of a wheel spindle apparatus of a grinding machine in which a hydraulic bearing according to the first embodiment of the present invention is provided.

A radial hydraulic bearing according to the present invention is employed, for instance, in a wheel spindle apparatus of a grinding machine as illustrated in FIG. 1. The hydraulic bearings 1 are arranged at both end portions of a bearing housing 2 to support a wheel spindle 19 as a rotating shaft at inner surfaces thereof. At one end of the wheel spindle 19, a grinding wheel G is attached. A driving belt (not shown in Figures) is tensionally strung between the other end of the wheel spindle 19 and a motor M1 through the driving belt, in which the wheel spindle 19 is rotated by the motor M1. The hydraulic bearings 1 are fixed in the bearing housing 2 by manners of a shrinkage fit or a press fit. At one end of each hydraulic bearing 1, a flange portion is formed and is fixed to the bearing housing 2 by plural bolts. Referring to FIG. 2, the radial hydraulic bearing 1 comprises a ring shape inner sleeve 1a as a bearing metal and a bearing case 1b wherein the inner sleeve 1a is fixed by such manners of a shrinkage fit or a press fit.

Plural hydrostatic pockets 21 are formed on an internal circumference surface of the inner sleeve 1a in a circumference direction and are disposed from each other with equal distance. As a shape of each hydraulic pocket 21 quadrilateral groove shown by FIG. 3(A), U-shape groove with leg portions extended in rotational direction of the wheel spindle 19 shown by FIG. 3(B) or quadrangular ring shape groove forming a land portion at a center thereof shown by FIG. 3(C) are applicable, for example. A land portion 7 for generating hydrodynamic pressure is defined as a portion or portions except hydrostatic pockets 21 from the internal circumference surface of the inner sleeve 1a. At a center of each hydrostatic pocket 21, one end of an oil-supplying hole 23 which has a throttle nozzle (not shown in Figures) is opened. The other end of each oil supplying hole 23 is connected with a oil supplying pass that is formed between a circumference groove formed on an outer surface of the inner sleeve 1a and an inner surface of the bearing case 1b. The oil-supplying pass is connected with a pump as a pressure fluid supplying source (not shown in Figures) which is driven by a motor (not shown in Figures), via an outside supplying pipe (not shown in Figures).

At an inside of the inner sleeve 1a, plural drain holes 4 are formed. One end of each drain hole 4 is opened on the land portion 7, and the other end thereof is connected with a tank via a drain pass 12 such that and an outside drain pipe 6. As a disposition of each the drain hole 4, for example, it is applicable one is opened as shown by FIGS. 3(A), 3(B) and 3(C), or that two are opened as shown by FIGS. 4(A), 4(B) and 4(C). In case of the quadrangular ring shape groove shown by FIG. 3(C) or 4(C), it is preferable that another drain hole 4 is disposed in the center land portion that is surrounded with the quadrangular ring shape groove. Check valves 3 are disposed on a way of the drain hole 4, the drain pass 12 and the outside drain pipe 6. The check valve 3 serves as one of an anti suctioning unit for preventing air from suctioning into the hydraulic bearing 1.

Figure 5:
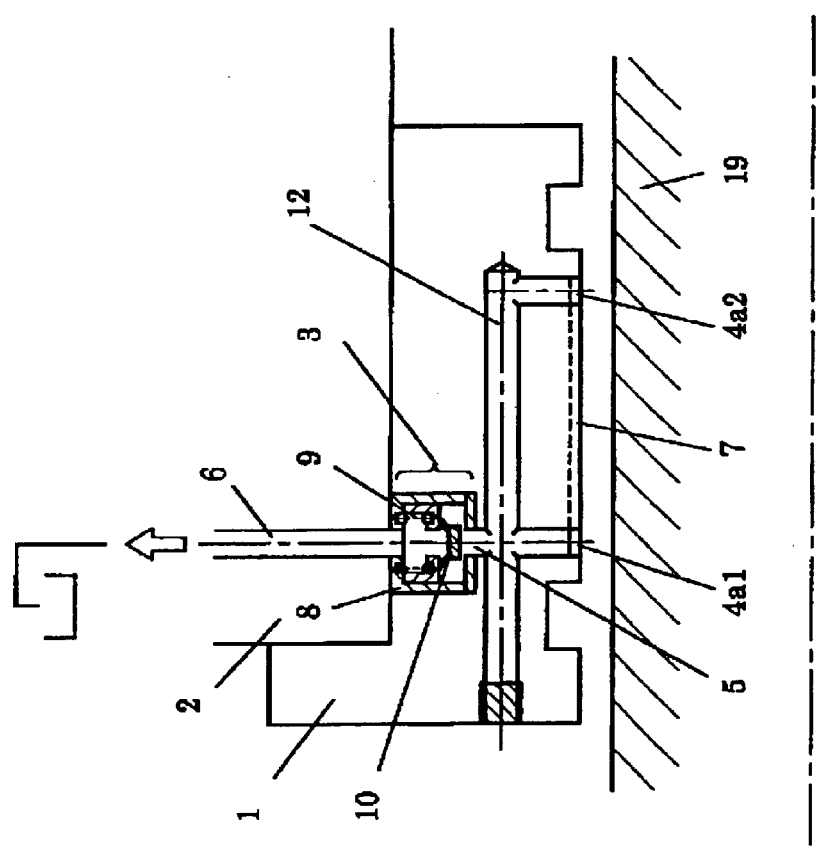
FIG. 5 is a sectional view of a hydraulic bearing according to the first embodiment of the present invention.

FIG. 5 shows a part of a cross section of the hydraulic bearing in this embodiment. Drain holes 4a1 and 4a2 are radially opened in each land portion 7 of the hydraulic bearing 1, and are disposed in a circumferential direction with equal distance from each other. Each of the drain holes 4a1 and 4a2 is connected to the outside drain pipe 6, via the drain pass 12 and the check valve 3 arranged in the hydraulic bearing 1. The check valve 3 is assembled from a case 8, a spring 9 and a valve element 10. In general, an opening 5 formed between the case 8 and the valve element 10 is opened by hydrodynamic pressure generated on the land portion 7 against closing force of the spring 9. In reverse, the opening 5 is closed when negative pressure is generated on the land portion 7.

At the above described radial hydraulic bearing 1, when lubricant oil is supplied to the supplying hole 23 by the pump through the outside supplying pipe, pressure of the lubricant oil is adjusted by the throttle nozzle. The pressure adjusted lubricant oil is filled in the hydrostatic pockets 21. Therefore, the hydrostatic pockets 21 generate hydrostatic pressure and the wheel spindle 19 is supported for the bearing metal by the hydrostatic pressure. That is, the hydraulic bearing 1 functions as a hydrostatic bearing. Besides, some of the lubricant oil filled in the hydrostatic pockets 21 flows out to both sides of the hydraulic bearing 1 through a clearance against the wheel spindle 19. And the other flows into between the land portion 7 and an outer surface of the wheel spindle 19. When the wheel spindle 19 is rotated relative to the bearing metal, hydrodynamic pressure is generated between the land portion 7 and the outer surface of the wheel spindle 19 by edge effect of the lubricant oil. That is, the hydraulic bearing 1 serves as a hydrodynamic bearing. Then, the lubricant oil is drained to each side of the bearing metal. In addition, the lubricant oil is drained from the drain holes 4a1 and 4a2 to the tank through the drain pass 12, the check valve 3 and the outside drain pipe 6.

Therefore, the lubricant oil is drained with not only each side of the bearing metal but also through the drain holes 4, so that drainage efficiency of the lubricant oil is improved. In other words, the lubricant oil does not remain at the land portions 7 but circulates through the drain holes 4. As the result, thermal expansion of the bearing metal due to heat generating at the land portion 7 is restrained. Then, since the drain holes 4 do not interrupt continuation of the land portion 7 like the drain grooves 22 of the prior art as shown by FIG. 12(C), deterioration of bearing rigidity is restrained. That is, the hydraulic bearing 1 of the first embodiment has a capacity of static rigidity that is close to the same of the non-separated type bearing as shown by FIGS. 12(A) and 12(B). Furthermore, the hydraulic bearing 1 has low temperature rise that is close to the same of the separated type bearing as shown by FIG. 12(C).

Figure 6:
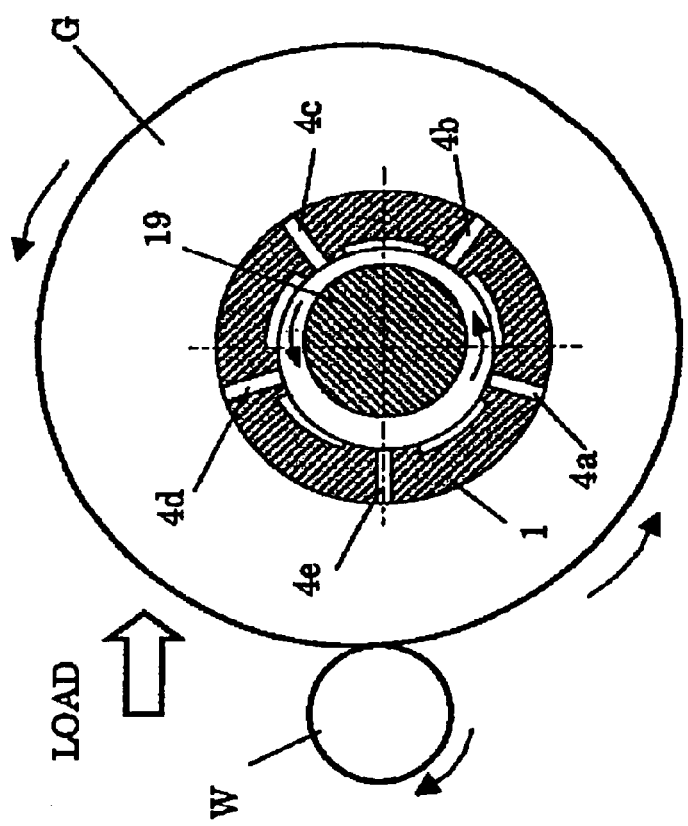
FIG. 6 is a sectional explanation view of a wheel spindle showing a direction of grinding force according to the first embodiment of the present invention.

By the way, as shown in FIG. 6, when the grinding wheel G attached to the wheel spindle 19 grinds a cylindrical workpiece W, the wheel spindle 19 receives a load, which is a grinding force generated by a grinding resistance, in constant direction as shown by an arrow. The load produces an eccentricity of the wheel spindle 19 relative to the hydraulic bearing 1. A function of the eccentricity, hereinafter, is described with FIGS. 7 and 8. Here, the check valve 3 is not shown by FIGS. 6 and 7.

Figure 7:
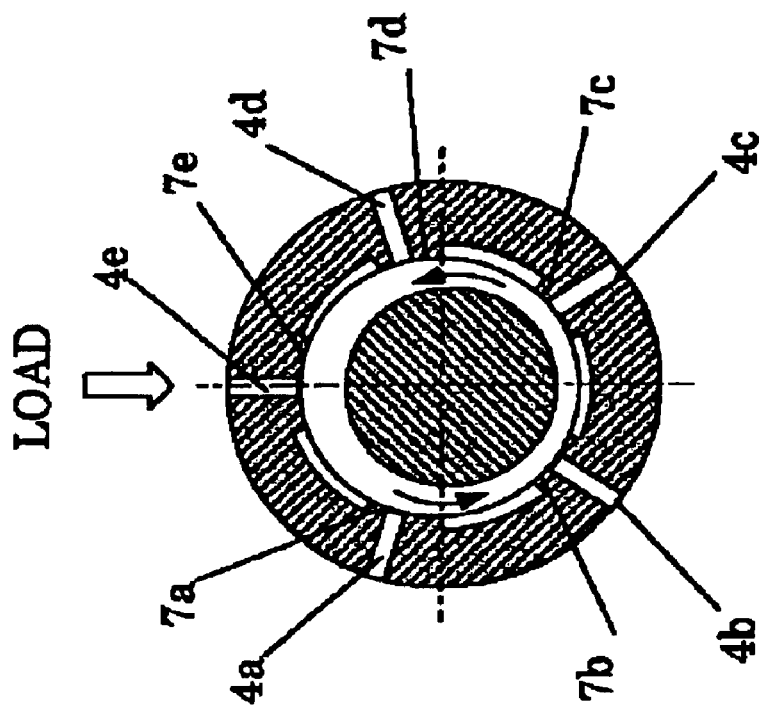
FIG. 7 is a sectional explanation view of a hydraulic bearing showing a direction of grinding force according to the first embodiment of the present invention.
Figure 8:
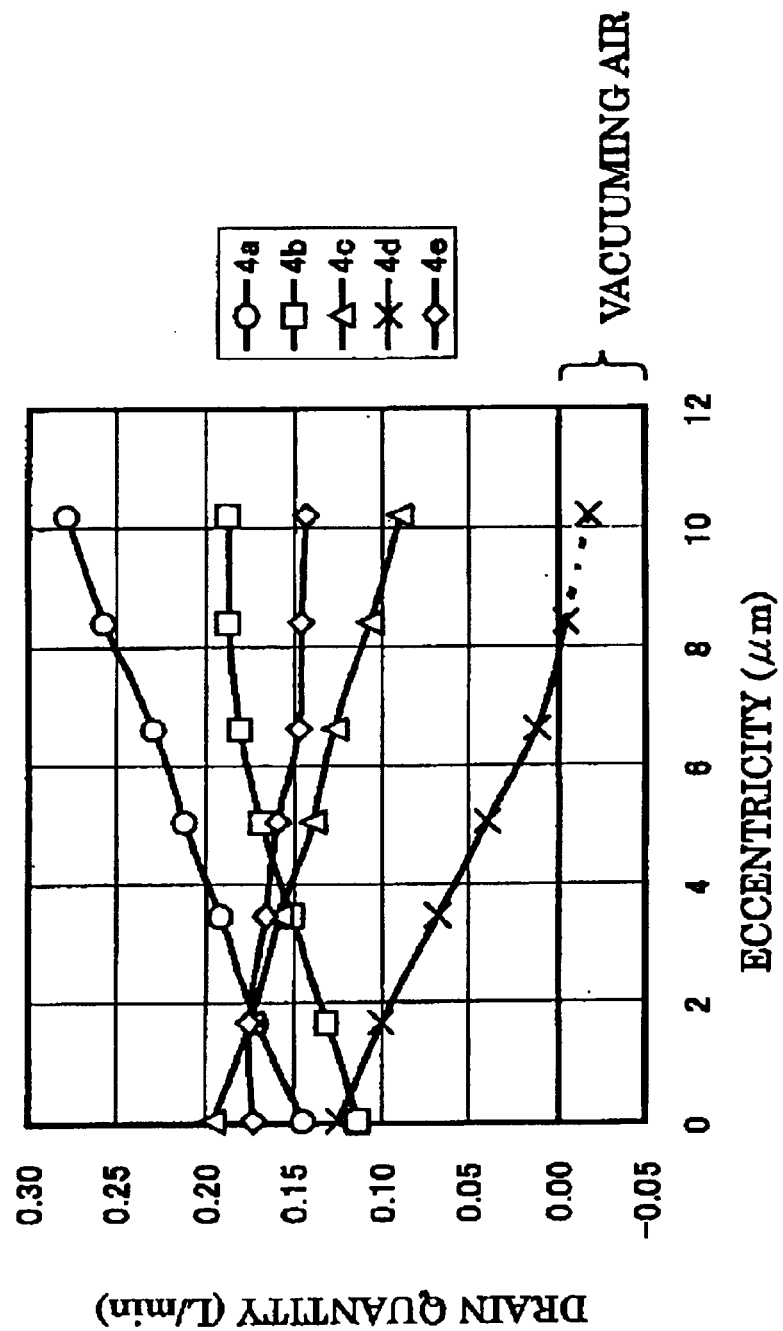
FIG. 8 is a graph showing relations between drain quantity and eccentricity of a spindle according to the first embodiment of the present invention.

As shown in FIG. 7, the load to the wheel spindle 19 in a direction from the drain hole 4e produces the eccentricity of the wheel spindle 19 relative to the hydraulic bearing 1. As a result, a clearance between the land portion 7e and the outer surface of the wheel spindle 19 increases. At the same time, the wheel spindle 19 rotates counterclockwise as shown in FIG. 7. So, at the land portions 7a and 7b, since the bearing clearance decreases in a direction of the lubricant oil flow, edge effect increases. As a result, as shown in FIG. 8, the lubricant oil flowing into the land portions 7a and 7b increases, so that the lubricant oil drained through the drain holes 4a and 4b increases. Oppositely, at the land portions 7c and 7d, since the bearing clearance increases in direction of the lubricant oil flow, edge effect decreases. As a result, as shown in FIG. 8, the lubricant oil flowing into the land portions 7c and 7d decreases, so that the lubricant oil drained through the drain holes 4c and 4d decreases. In particular, at the land portion 7a, a clearance between the land portion 7a and the wheel spindle 19 becomes smaller relative to the rotational direction of the wheel spindle 19 because of the eccentricity, as shown in FIG. 7. In reverse, at the land portions 7d, a clearance between the land portion 7d and the wheel spindle 19 becomes larger relative to the rotational direction of the wheel spindle 19 because of the eccentricity, as shown in FIG. 7. Therefore, at the drain holes 4a and 4d of the land portions 7a and 7d, the drain quantity varies rapidly in response to the eccentricity amount as shown in FIG. 8. At the land portion 7e, with the bearing clearance increasing, edge effect decreases in response to the eccentricity growth.

When the eccentricity of the wheel spindle 19 grows more, negative pressure generates at the land portion 7d. Here, without the check valve 3 as shown by FIGS. 2 or 5, air is suctioned into the hydraulic bearing 1 through the drain hole 4d as shown by the broken line in FIG. 8. However, in response to the pressure decreasing with the eccentricity of the wheel spindle 19, the check valve 3 connected to the drain hole 4d shuts the opening 5 by the valve element 10 due to negative pressure at the land portion 7d with force of the spring 9. When the pressure at the land portion 7d become less than atmospheric pressure, or equal to that defined by force of the spring 9, the opening 5 is closed by the valve element 10. So, if negative pressure generates at the land portion 7d because of further eccentricity or rotational speed of the wheel spindle 19, air cannot be suctioned into the hydraulic bearing 1 by shut of the opening 5. So, cavitation generated by suctioning air is prevented. Even if the check valve 3 is not disposed in the hydraulic bearing 1 in FIG. 5, the check valve 3 may be disposed on the way of the drain pass 12 or the outside drain pipe 6.

Therefore, the hydraulic bearing 1 is effective in high rigidity because of large and continuous land portions 7 similar to the non-separated type. Further, thermal expansion of the hydraulic bearing 1 is restrained since the lubricant oil at the land portions 7 is drained similar to the separated type. Furthermore, the check valve 3 prevents air from suctioning into the hydraulic bearing 1. Thus, the hydraulic bearing according to the present invention has both features of the separated and non-separated types.

[Second Embodiment]

Figure 9:
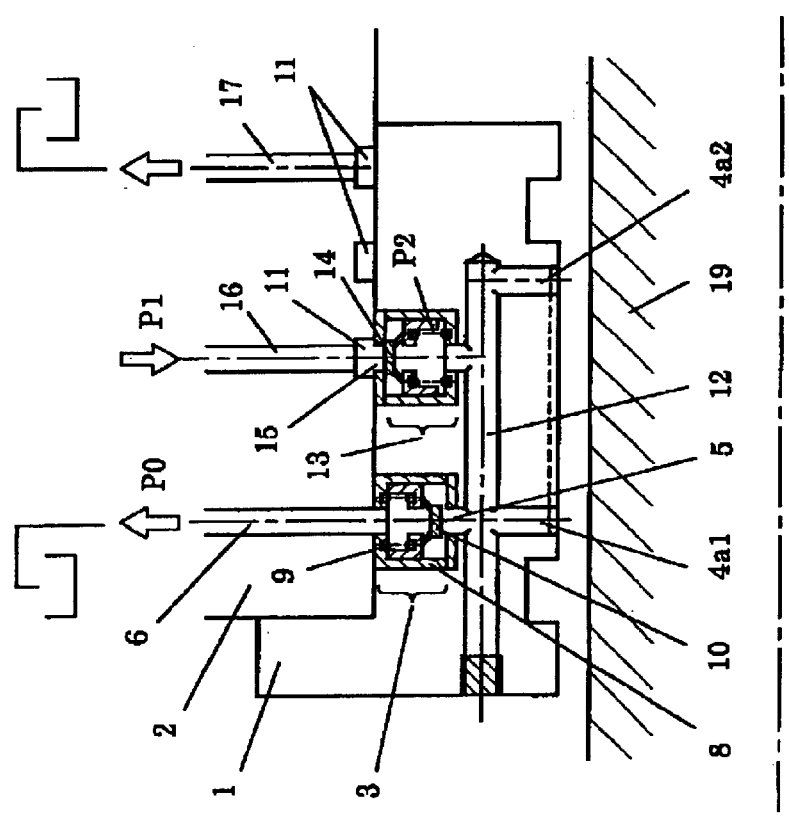
FIG. 9 is a sectional view of a hydraulic bearing according to second embodiment of the present invention.

Second embodiment according to the present invention will be described hereinafter with reference to the drawings, in which explanation about the same construction as the first embodiment is omitted. Referring to FIG. 9, the hydraulic bearing 1 includes the check valve 3 to prevent air from suctioning when the pressure between the land portion 7 and the wheel spindle 19 becomes negative pressure with same manner as the first embodiment. In addition, the hydraulic bearing 1 includes an oil-suctioning unit 13 to suction lubricant oil at the same time. The oil-suctioning unit 13 is disposed between an oil-suctioning pass 16 formed in the bearing housing 2 and the drain pass 12 connected to the drain holes 4a1 and 4a2. The oil-suctioning unit 13 is, for example, like the check valve 3 turning upside down and includes a valve element 14 biased a spring in a case. The valve element 14 usually closes an opening 15 because of the spring force.

The inner surface of the bearing housing 2 forms a coolant oil pass 11 like a spiral groove. The coolant oil pass 11 is connected to the oil-suctioning pass 16 at one end. The coolant oil pass 11 is also connected to a tank via an outside drain pass 17 at the other end. Coolant oil pressurized at P1 is supplied to the coolant oil pass 11 from the oil-suctioning pass 16. The coolant oil flows the spiral coolant oil pass 11 to cool the hydraulic bearing 1 and is drained to the tank through the outside drain pass 17. Here, the same oil as the lubricant oil is used as the coolant oil.

The pressure P1 of the coolant oil supplied from the oil-suctioning pass 16 is higher than the pressure P2 by the spring force and is lower than the pressure P0 of the drained oil (the lubricant oil) when the check valve 3 opens. Usually, pressurized lubricant oil is supplied from the land portion 7 to the drain pass 12 through the drain holes 4a1 and 4a2. Since the lubricant oil urges the valve element 10 against the spring 9 and flows through the opening 5, the lubricant oil is drained to the tank through the outside drain pipe 6. At the same time, the opening 15 is closed because the spring force and the pressure P0 of the lubricant oil urges the valve element 14, so that the oil-suctioning pass 16 is separated from the drain holes 4a1 and 4a2. Therefore, the coolant oil from the oil-suctioning pass 16 flows around and cools down the outer surface of the hydraulic bearing 1 through the coolant oil pass 11. Then, the coolant oil is drained to the tank.

When the pressure of the lubricant oil decreases less than the atmospheric pressure or so, the valve element 10 of the check valve 3 closes the opening 5. Then, the pressure P1 of the coolant oil is larger than the pressure P2 by the spring force, so that the valve element 14 of the oil-suctioning unit 13 opens the opening 15. Therefore, the coolant oil is supplied to the land portion 7 trough the drain holes 4a1 and 4a2.

According to the hydraulic bearing 1 of the second embodiment, if negative pressure generates at the land portion 7, the hydraulic bearing 1 prevents to suction air therein. So, cavitation generated by suctioning air can be prevented. At the same time, the coolant oil is supplied from the oil-suctioning pass 16 to the land portion 7 through the drain holes 4a1 and 4a2, so that the coolant oil cools down the land portion 7 whose temperature is regionally high without draining function. Therefore, with supplying the coolant oil, the hydraulic bearing 1 can prevent cavitation caused with dissolved in the oil separating by temperature rise. Further, the hydraulic bearing 1 can prevent cavitation caused with dissolved air in the oil under the saturated vapor separating pressure. Besides, the hydraulic bearing 1 is usually cooled down by the coolant oil through the coolant oil pass 11.

Therefore, the hydraulic bearing 1 is effective in high rigidity because of large and continuous land portions 7 similar to the non-separated type. Further, thermal expansion of the hydraulic bearing 1 is restrained since the lubricant oil at the land portions 7 is drained similar to the separated type. And, the check valve 3 prevents suctioning air into the hydraulic bearing 1. Thus, the hydraulic bearing according to the present invention has both features of the separated and non-separated types. Furthermore, the hydraulic bearing 1 is usually cooled down by the coolant oil through the coolant oil pass 11. Moreover, even if negative pressure generates, the land portion 7 is cooled down since the coolant oil flows into the bearing 1.

[Third Embodiment]

Figure 10:
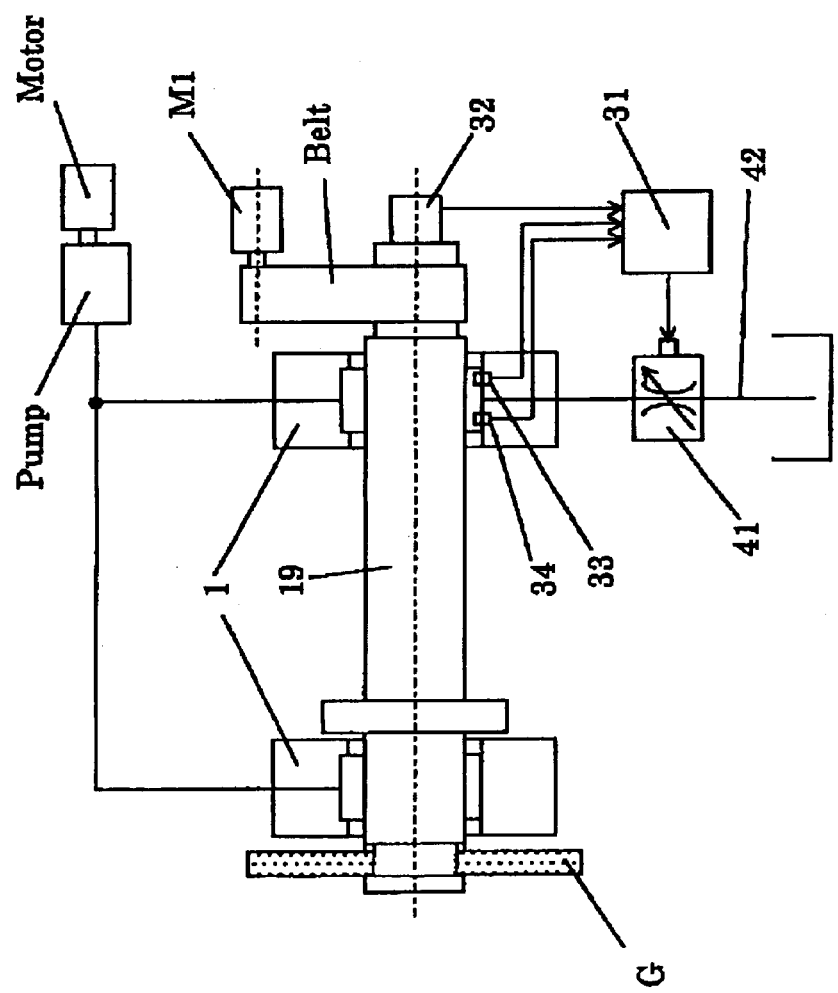
FIG. 10 is a schematic illustration of a wheel spindle apparatus of a grinding machine according to third embodiment of the present invention.

Third embodiment according to the present invention will be described hereinafter with reference to the drawings, in which explanation about the same construction as the first and the second embodiment is omitted. Referring to FIG. 10, various sensors are provided for a wheel spindle apparatus of the third embodiment in addition to the constitution of the previous embodiments. An encoder 32, one of the various sensors, is attached on an end portion of the wheel spindle 19 to measure rotating speed of the wheel spindle 19. One or more pressure gauges 33 serving as a sensor are attached at appropriate positions of the land portions 7 to measure pressure thereat. A gap sensor 34 is disposed on the inner surface of the hydraulic bearing 1 to measure a bearing clearance (eccentricity of the wheel spindle 19 relative to the hydraulic bearing 1) therebetween. Each of the sensors 32, 33 and 34 is connected electrically to a controller 31 to input its output therefrom. The controller 31 is connected electrically to a variable metering orifice 41 to control opening of the metering orifices 41. The metering orifice 41 is on a way of a drain pass 42 and serves as an anti suctioning unit according to the present invention. Here, all sensors are not required to be installed, it is possible that one or some sensors is/are installed selectively.

At the above described third embodiment, pressure in the hydraulic bearing 1 is defined by the relationship between the eccentricity and the rotational speed of the wheel spindle 19. And the controller 31 memorizes the relationship and controls the opening of the metering orifice 41 according to the output of the encoder 32 and the gap sensor 34. Or, the controller 31 controls the opening of the metering orifice 41 when the output of the pressure gauges 33 is lower than threshold pressure equal to atmospheric pressure or so, with on/off or continuously variable controlling.

With controlling the metering orifice 41 as above, suctioning air into the hydraulic bearing 1 is prevented, so that cavitation generated by suctioning air is prevented. By the way, the sensors 33 and 34 are installed to the hydraulic bearing 1 disposed at an opposite end against the grinding wheel G the same construction may be used to the hydraulic bearing 1 which are nearer from the grinding wheel G or to the both.

Therefore, the hydraulic bearing 1 is effective in high rigidity because of large and continuous land portions 7 similar to the non-separated type. Further, thermal expansion of the hydraulic bearing 1 is restrained since the lubricant oil at the land portions 7 is drained similar to the separated type. Furthermore, controlling the metering orifice 41 prevents air from suctioning into the hydraulic bearing 1. Thus, the hydraulic bearing according to the present invention has both features of the separated and non-separated types.

[Forth Embodiment]

Figure 11:
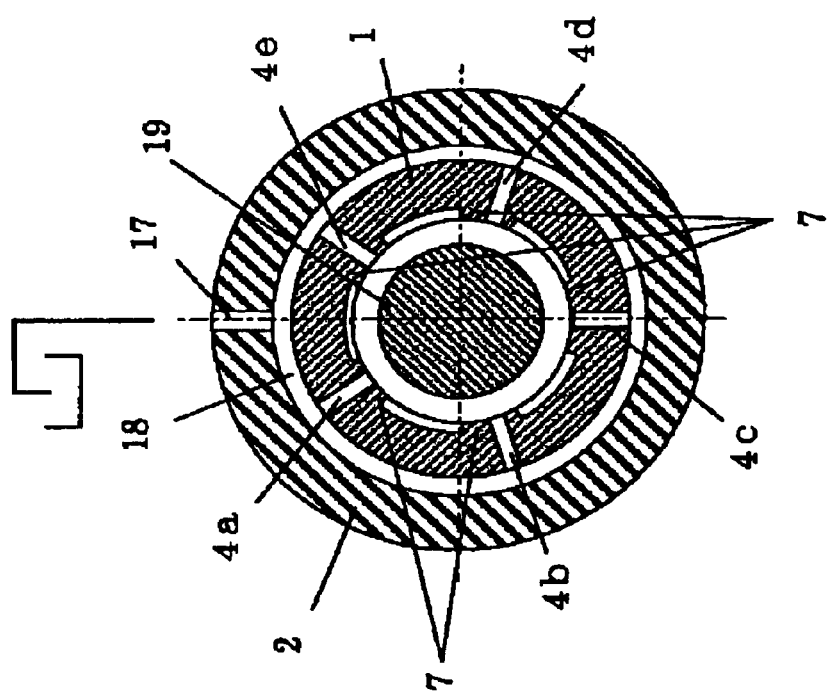
FIG. 11 is a sectional view of a hydraulic bearing according to forth embodiment of the present invention.

FIG. 11 shows the forth embodiment. The hydraulic bearings 1 are fixed in the inner surface of the bearing housing 2 by manners of a shrinkage fit or a press fit. At one region of the inner surface of the bearing housing 2, a circumference oil-saving groove 18 is formed thereon. The drain holes 4a to 4e penetrate into the hydraulic bearing 1 radially. And each drain hole 4a to 4e opens to the land portion 7 at its one end, and to the oil-saving groove 18 at the other end. The lubricant oil is filled in the oil-saving groove 18 connected to the drain pass 17 which penetrates the bearing housing 2 upwardly and connects to the tank. By the way, the circumference oil-saving groove 18 may be formed on the outer surface of the hydraulic bearing 1.

At above described forth embodiment, the oil-saving groove 18 functions as the anti suctioning unit to prevent suctioning air into the hydraulic bearing 1. Usually, the lubricant oil flowing to the land portions 7 flows to the oil-saving groove 18 through the drain holes 4a to 4e. But when negative pressure generates at the land portion 7, the lubricant oil filled in the oil-saving groove 18 is suctioned into the land portion 7 through any of the drain hole 4a to 4e without suctioning air into the hydraulic bearing 1. So, cavitation generated by suctioning air can be prevented.

Therefore, the hydraulic bearing 1 is effective in high rigidity because of large and continuous land portions 7 similar to the non-separated type. Further, thermal expansion of the hydraulic bearing 1 is restrained since the lubricant oil at the land portions 7 is drained similar to the separated type. Furthermore, the oil-saving groove 18 prevents air from suctioning into the hydraulic bearing 1. Thus, the hydraulic bearing according to the present invention has both features of the separated and non-separated types.

According to the present invention, the load is limited only one direction when the hydraulic bearing 1 is installed to a grinding machine as shown FIGS. 6 to 8. Therefore, the land portion 7 that negative pressure is generated is specified, it is possible to install the anti suctioning unit on only that land portion.

Obviously, numerous modifications and variations of the present invention are possible in light of the above teaching. It is therefore to be understood that within the scope of the appended claims, the present invention may be practiced otherwise than as specifically described herein.

What is claimed is:

1. A hydraulic bearing that supports a rotating shaft comprising:

a bearing metal for rotatably supporting the rotating shaft;

at least one hydrostatic pocket formed on an inner surface of the bearing metal;

a pressure fluid supplying source;

an oil-supplying hole opened in the hydrostatic pocket and providing pressure fluid from the pressure fluid supplying source to the hydrostatic pocket for generating hydrostatic pressure therein;

at least one land-portion formed on the inner surface of the bearing metal except the hydrostatic pocket, which generates hydrodynamic pressure in response to a rotation of the rotating shaft;

a drain hole formed on the land portion and draining the fluid through a drain passage; and anti suctioning means installed at the drain passage to prevent air from suctioning through the drain passage and into the hydraulic bearing.

2. A hydraulic bearing according to claim 1, wherein the anti suctioning means comprises a check valve.

3. A hydraulic bearing according to claim 1, wherein the anti suctioning means comprises a metering orifice and at least one sensor, wherein said metering orifice is controlled according to said at least one sensor.

4. A hydraulic bearing according to claim 3, wherein the metering orifice is a variable valve.

5. A hydraulic bearing according to claim 3, wherein the metering orifice is an on/off controlling valve.

6. A hydraulic bearing according to claim 3, wherein the at least one sensor is a pressure sensor to measure fluid pressure in the hydraulic bearing.

7. A hydraulic bearing according to claim 3, wherein the at least one sensor is a combination of a speed sensor to measure rotational speed of the rotating shaft and a gap sensor to measure a clearance between the bearing metal and the rotating shaft.

8. A hydraulic bearing according to claim 7, wherein a relationship of both sensors output defines pressure between the bearing metal and the rotating shaft; and the opening of the metering orifice is controlled in response to the defined pressure.

9. A hydraulic bearing according to claim 1, wherein the anti suctioning means further comprises an oil-saving groove filled the fluid therein.

10. A hydraulic bearing according to claim 1 further comprising an oil-suctioning unit 13 to suction a coolant fluid into the hydraulic bearing while the anti suctioning means prevents air from suctioning.

11. A hydraulic bearing according to claim 10 further comprising a pass formed around the hydraulic bearing; and the coolant fluid flows in the pass to cool the hydraulic bearing.

12. A hydraulic bearing according to claim 11, wherein the coolant fluid flows in the pass unless the oil-suctioning means suctions the coolant fluid.

13. A hydraulic bearing that supports a rotating shaft comprising:

a bearing metal for rotatably supporting the rotating shaft;

at least one hydrostatic pocket formed on an inner surface of the bearing metal;

a pressure fluid supplying source;

an oil-supplying hole opened in the hydrostatic pocket and providing pressure fluid from the pressure fluid supplying source to the hydrostatic pocket for generating hydrostatic pressure therein;

at least one land-portion formed on the inner surface of the bearing metal except the hydrostatic pocket, which generates hydrodynamic pressure in response to rotation of the rotating shaft;

a drain hole formed on the land portion for draining the fluid;

a drain passage; and a circumferentially extending oil saving groove installed between the drain hole and the drain passage in a direction of flow of fluid being drained from the drain hole, wherein said drain hole and said drain passage are arranged such that said oil saving groove separates said drain hole from said drain passage to prevent air from suctioning through the drain passage and said drain hole, and into the hydraulic bearing.

* * * * *